United States Patent Office 2,927,001
Patented Mar. 1, 1960

2,927,001

PRODUCTION OF AMMONIA AND SULFUR-BEARING MATERIALS FROM AMMONIUM SULFATE

Robert F. McCullough, Glenview, Ill., assignor, by mesne assignments, to the United States of America as represented by the United States Atomic Energy Commission No Drawing. Application June 30, 1958
Serial No. 745,249

17 Claims. (Cl. 23—193)

This invention relates to the decomposition of ammonium sulfate. More particularly it relates to a method of obtaining from sulfates of ammonia, an ammonia gas and a sulfur dioxide gas of concentrations utilizable for further processing. Still more particularly it relates to a method for substantially complete recovery of sulfur as oxides and ammonia in substantially pure form.

The thermal decomposition of sulfates such as ammonium sulfate, alkali metal sulfate and heavy metal sulfates such as iron and copper sulfate, with or without catalysts, has been practiced for many years. Iron sulfates and ores containing sulfates have been roasted and decomposed in furnaces under conditions such that sulfur dioxide has been liberated. The sulfur dioxide was further processed to produce sulfuric acid and the iron or similar metal was recovered as a spongy oxide, the decomposition having been substantially complete.

In the case of ammonium sulfate, however, thermal decomposition is relatively unimportant commercially because only 1 mol of ammonia gas is freed at moderately high temperatures leaving as a by-product the stable ammonium acid sulfate. Further, when ammonia is freed in the presence of oxides of sulfur, at a temperature of the order of 300° C to 500° C. a reaction occurs between the two resulting in the reduction of ammonia to nitrogen.

It is a principal object of the present invention therefore, to provide a method of treating ammonium sulfate whereby there is obtained substantially complete decomposition of the salt and thereby permitting relatively complete recovery of the anion and cation components as gaseous products or as ammonium hydroxide and sulfuric acid.

It is another object of the invention to obtain decomposition under conditions giving optimum concentrations of ingredients.

It is a further object to effect decomposition under conditions whereby the gases are evolved in stages with substantially only one type gas being evolved in each stage.

It is still a further object of this invention to provide a process for the catalytic production of ammonia and of sulfur dioxide or sulfur trioxide or both in which the reactant is recoverable in substantially unaltered form for recirculation in the process.

It is still another object of the invention to provide a process wherein cationic sulfates are formed and maintained in solid phase during the time that the ammonia is being volatilized, which solid phase may at a higher temperature be substantially decomposed, thus making for economical operation.

These and other objects of the invention such as temperature control will be apparent from the following description to those skilled in the art.

The new and novel invention is based upon the discovery that a solid phase reaction can be initiated and completed between ammonium sulfate and a metal oxide reactant, by which is meant a metal oxide capable of effecting liberation of ammonia gas while maintaining all or substantially all of the sulfate in the solid state, which solid state in turn can be partially or completely decomposed to give sulfur oxide and a regenerated reactant.

Such reactions may be illustrated as follows:

$$(NH_4)_2SO_4 + ZnO \longrightarrow 2NH_3(gas) + H_2O + ZnSO_4$$
$$ZnSO_4 + \Delta(heat) \longrightarrow SO_3(gas) + ZnO$$
$$\Updownarrow$$
$$SO_2 + O$$

In carrying out the method of the instant invention, ammonium sulfate or ammonium acid sulfate or mixtures of these two compounds are mixed with a reactant consisting of basic metal oxide and the sulfate-oxide mixture heated to a temperature in excess of about 300° C. The residual salt or solids after removal of ammonia gas is then heated to a temperature which effects decomposition of the residue solids.

Representative effective metal oxides are nickel oxide, strontium oxide, zinc oxide, all of which are characterized by a rapid reaction with sulfate ions at temperatures below 500° C. and whose sulfates decompose at a temperature above 500° C.

At the lower temperatures in the range of about 300 to about 350° C. the decomposition reaction which frees ammonia is relatively slow in the presence of zinc oxide as the sole reactant. It requires about 45 to 90 minutes for essentially complete volatilization of the ammonia utilizing zinc oxide depending upon heat transfer conditions. When using higher temperatures of the order of about 400 to 500° C. the decomposition rate is greatly accelerated. At about 400° C. for example, substantially complete evolution of ammonia in the presence of zinc oxide occurs in about 30 to 45 minutes, and at higher temperatures the primary concern is control of the operation so as to effect substantially complete ammonia recovery, while at the same time preventing or minimizing sulfur oxide volatilization.

The preferential volatilization of ammonia in the temperature range between about 300° C. and about 500° C. apparently results from formation of metal sulfate or complexes at a rate faster than that at which sulfate would be volatilized. The ammonia is recovered substantially free of sulfur components. The reaction tending to retain the sulfur values in the solid state gives a sulfate material possibly a salt as residue.

Zinc oxide is the preferred reaction material because the reaction freeing ammonia goes to completion before any significant decomposition of zinc sulfate and/or reaction products. This type reaction permits independent recovery of substantially pure ammonia and oxides of sulfur.

If absolute purity is not needed and some contamination of ammonia with nitrogen, sulfur dioxide, etc., can be tolerated, then such oxides as iron oxide and the like can be utilized. Calcium oxide is capable of reaction freeing relatively pure ammonia but is economically not as acceptable as zinc oxide because of the high temperature required for calcium sulfate decomposition.

The effective minimum quantity of oxides required for this reaction is the stoichiometric equivalent of ammonium sulfate, i.e., 1 mol of oxide for each mol of ammonium sulfate reacted. In commercial operation, an excess of oxide over the stoichiometric equivalent is generally used to insure complete reaction. Up to about 100% excess has been utilized but for zinc oxide, about 10% excess is an economical amount for insuring complete reaction.

When utilizing a metal oxide, for example zinc oxide, the zinc oxide-zinc sulfate residue solids from the calcination operation is substantially completely thermally decomposed by subjection to temperatures in excess of about 925° C. Other oxides may have a higher or lower optimum decomposition temperature. Preferably the decomposition of zinc oxide is effected at temperatures in the range between about 960° C. and about 1200° C. Temperatures above 1200° C. have little economic value since the decomposition rate only increases slightly with increase in temperature. Temperatures of about 900° C. will decompose zinc sulfate but require uneconomical lengths of time to obtain substantially complete decomposition. In tests, decomposition of zinc sulfate at 850° C. to about 900° C. only progressed to about 90–92% upon 1 hour of heating. Under some circumstances, complete decomposition of metal sulfate may be dispensed with since it merely increases the recirculation load. The zinc sulfate, for example, which would be recycled with zinc oxide would be merely an ingredient inactive under the ammonia volatilizing conditions which may be decomposed in the next metal sulfate decomposition operation.

Decomposition or heating operations may be carried out with either operation or both, being batchwise or continuous as in a furnace or equivalent apparatus. In a continuous operation, it is preferable that two independent heating chambers be utilized, the first being held at temperatures of about 450° C. and being adapted for recovery of substantially pure ammonia from the effluent gases while the effluent solids pass to the higher temperature unit for zinc sulfate decomposition. Hot solids from this sulfate decomposition reaction may be directly cycled to mixing with the ammonium sulfate.

The differences in the decomposition operation utilizing zinc oxide over those utilizing iron oxide are illustrated by the following examples:

*Example 1*

132 parts dry granular ammonium sulfate and 90 parts of zinc oxide were mixed by treatment in a ball mill until a relatively uniform mixture was obtained. This mixture was placed in a decomposing oven which was externally heated. Temperature within the decomposing oven was maintained at about 440° C.

From the gases evolved were recovered 34 parts by weight of ammonia. From the calcining kiln 172 parts by weight of solids were recovered.

The hot solids from the calcining operation were decomposed in the heated oven. When the solids were heated to about 1000° C. gases evolved were a mixture of sulfur dioxide and sulfur trioxide.

From this thermal decomposition operation was recovered about 91 parts by weight of zinc oxide of 99+% purity (about 100% recovery).

*Example 2*

Dry granular ammonium sulfate and ferric oxide were mixed in a ball mill in the ratio of 132 parts by weight of ammonium sulfate to 175 parts by weight of oxide. The mixture was divided into three portions, A, B, and C. Each of the portions was heated in the externally heated oven used to decompose the composition of Example 1. Portion A was heated to 300° C. for 3½ hours. Portion B was heated to 400° C. for 1 hour. Portion C was heated to 500° C. for 1 hour. Gases evolved were bubbled through a solution containing measured amounts of barium chloride, phosphoric acid and potassium iodate to determine the amounts of sulfur oxides liberated in this low temperature decomposition, the sulfur being determined by the quantity of barium sulfate precipitated.

At 300° C. approximately 26.5 parts by weight of ammonia were recovered. This constituted liberation of approximately 78% of the ammonia present, and incomplete decomposition. At this temperature there was precipitated barium sulfate in a quantity showing liberation of approximately 3% of the sulfate ions present in the reaction.

At 400° C. approximately 34 parts by weight of ammonia were recovered constituting liberation of approximately 99+% of the ammonia present. At this temperature there was liberated approximately 12½% of the sulfate ions present.

At 500° C. approximately 34 parts by weight of ammonia were recovered constituting liberation of 99+% of the ammonia present. At this higher temperature approximately 27% of the sulfate ions present were volatilized.

From the above data it will be apparent that ferric oxide is not the equivalent of zinc oxide in this process if purity of ammonia gas is the only consideration, because at no temperature when complete liberation of ammonia is effected does the iron oxide hold captive substantially all of the sulfate ions, thus enabling the recovery of ammonia and oxides of sulfur in substantially uncontaminated form.

It will be recognized that zinc oxide may be added as pure zinc oxide or as oxide diluted with zinc sulfate or with diluent inert under the above reaction conditions such as alumina or aluminum silicate, the inerts generally being used if the materials are pelletized before passage through the heating zone.

This application is a continuation-in-part of application Serial No. 339,887, filed March 2, 1953, by Robert F. McCullough and entitled Production of Ammonia and Sulfur-Bearing Materials From Ammonium Sulfate, and now abandoned.

Having thus fully described and illustrated the character of the invention, what is desired to be secured and claimed by Letters Patent is:

1. The method of successively producing relatively pure gaseous ammonia and relatively pure gaseous oxides of sulfur by decomposing sulfates of ammonia which comprises mixing metal oxide reactant selected from the group consisting of nickel oxide, strontium oxide, and zinc oxide, with the sulfate and heating the mixture to a temperature within the limits of the range of about 300° C. to about 1200° C., the temperature of the solids being raised in at least two distinct stages so as to separately evolve ammonia and oxides of sulfur and recycling the resultant metal oxide solids to the mixing operation.

2. The method of successively producing relatively pure gaseous ammonia and relatively pure gaseous oxides of sulfur by decomposing a sulfate of ammonia which comprises mixing metal oxide reactant selected from the group consisting of nickel oxide, strontium oxide, and zinc oxide, with the sulfate, heating the mixture to a temperature within the range of about 300° C. to about 500° C. while evolving gaseous ammonia, then subjecting the residue solids to a temperature in the range between about 850° C. and about 1200° C. to evolve oxides of sulfur and recycling the resultant metal oxide solids to the mixing operation.

3. The method of successively producing relatively pure gaseous ammonia and relatively pure gaseous oxides of sulfur by decomposing sulfates of ammonia which comprises mixing metal oxide reactant selected from the group consisting of nickel oxide, strontium oxide, and zinc oxide, with ammonium sulfate, heating the mixture to a temperature in the range between about 300° C. and about 500° C., and recovering substantially pure ammonia, then treating the residue solids to a temperature in the range between about 850° C. and about 1200° C. and recovering the oxides of sulfur, and recycling the resultant metal oxide solids to the mixing operation.

4. The method of decomposing ammonium sulfate into ammonia and oxides of sulfur which comprises mixing zinc oxide with ammonium sulfate, heating the mixture to a temperature in the range between about 300° C. and about 500° C., recovering the ammonia gas, subjecting the residue solids to heat treatment in the range between about 850° C. and about 1200° C. to volatilize oxides of sulfur and recycling the resultant zinc oxide to the mixing step.

5. A process as in claim 4 wherein the zinc oxide is associated with an inert diluent.

6. A process as in claim 4 wherein the zinc oxide is associated with alumina.

7. The method of successively producing relatively pure gaseous ammonia and relatively pure gaseous oxides of sulfur by decomposing the sulfates of ammonia which comprises mixing metal oxide reactant selected from the group consisting of nickel oxide, strontium oxide, and zinc oxide, each in association with an inert diluent, with a sulfate of ammonia, heating the mixture to a superatmospheric temperature sufficient to evolve ammonia, but below about 500° C., and recovering substantially pure ammonia, then treating the residual solids to a still higher temperature sufficient to evolve oxides of sulfur, but below about 1200° C., recovering the oxides of sulfur and recycling the resultant solid metal oxide composition to the mixing operation.

8. A process as in claim 7 wherein the composition contains alumina as an inert diluent.

9. A method of successively producing relatively pure gaseous ammonia and relatively pure oxides of sulfur by decomposing a sulfate of ammonia which comprises mixing zinc oxide with a sulfate of ammonia, heating the mixture to a superatmospheric temperature sufficient to evolve ammonia, but below about 500° C., and recovering substantially pure ammonia, then treating the residual solids to a still higher temperature sufficient to evolve oxides of sulfur, but below about 1200° C., recovering oxides of sulfur and recycling the resultant zinc oxide to the mixing operation.

10. A process as in claim 9 in which the zinc oxide is in association with an inert diluent.

11. A process as in claim 9 in which the zinc oxide is in association with alumina.

12. A method of successively producing relatively pure gaseous ammonia and relatively pure gaseous oxides of sulfur by decomposing sulfates of ammonia which comprises mixing ammonium sulfate with zinc oxide, heating the mixture to a temperature in the range effective to cause a reaction between the zinc oxide and the ammonium sulfate to form zinc sulfate and gaseous ammonium, recovering substantially pure ammonia; then heating the residue zinc sulfate to a temperature range effective to cause thermal decomposition of the zinc sulfate, recovering the oxides of sulfur thus formed, and recycling the resulting zinc oxide to the mixing operation.

13. A process as in claim 12 wherein the zinc oxide is in association with an inert diluent.

14. A process as in claim 12 in which the zinc oxide is in association with alumina.

15. A method of successively producing relatively pure gaseous ammonia and relatively pure gaseous oxides of sulfur by decomposing at least one sulfate of ammonia which comprises mixing at least one sulfate of ammonia with a metal oxide selected from the group consisting of nickel oxide, strontium oxide, and zinc oxide, heating the mixture to a temperature in the range effective to cause a reaction between the metal oxide and ammonium sulfate to form metal sulfate and gaseous ammonia, recovering substantially pure ammonia, then heating the residual metal sulfate to a temperature range effective to cause thermal decomposition of the metal sulfate, recovering the oxides of sulfur thus formed, and recycling the resultant metal oxide to the mixing operation.

16. A process as in claim 15 wherein the metal oxide is in association with an inert diluent.

17. A process as in claim 15 wherein the metal oxide is in association with alumina.

References Cited in the file of this patent

UNITED STATES PATENTS 471,147    Scollay  ---------------  Mar. 22, 1892